(12) United States Patent
Vincent

(10) Patent No.: US 6,450,878 B1
(45) Date of Patent: Sep. 17, 2002

(54) VENTILATION MODULE

(75) Inventor: Philippe Vincent, Epernon (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/606,408

(22) Filed: Jun. 29, 2000

(30) Foreign Application Priority Data

Jun. 30, 1999 (FR) .......................................... 99 08370

(51) Int. Cl.$^7$ ................................................ B60H 1/26
(52) U.S. Cl. ...................................... 454/139; 415/151
(58) Field of Search ........................... 454/139; 415/151

(56) References Cited

U.S. PATENT DOCUMENTS

| | | | |
|---|---|---|---|
| 4,476,773 A | | 10/1984 | Fehr |
| 5,273,487 A | * | 12/1993 | Dauvergne .................. 454/139 |
| 5,391,112 A | | 2/1995 | Wardlaw |
| 5,879,230 A | | 3/1999 | Wardlaw et al. |
| 5,997,246 A | * | 12/1999 | Humbad |
| 6,142,864 A | * | 11/2000 | Uemura et al. ......... 454/139 X |

FOREIGN PATENT DOCUMENTS

| | | | | |
|---|---|---|---|---|
| JP | 63-188515 A | * | 8/1988 | .................. 454/139 |
| JP | 1-244912 A | * | 9/1989 | .................. 454/139 |

* cited by examiner

*Primary Examiner*—Harold Joyce
(74) *Attorney, Agent, or Firm*—Liniak, Berenato, Longacre & White

(57) ABSTRACT

A ventilation module optimized as to size, accessibility and air circulation, including an motorized fan unit (MFU) (2) for at least one suction turbine (16), a shell housing (15) accommodating the turbine (16) driven in rotation by an electric motor about a central rotational axis (Z'Z), the shell (15) being coupled to at least one air intake (11, 12) and outlet (13) formed in an outer casing (10), the incoming air being sucked in by the turbine (16) through at least one central orifice ($\Omega 1, \Omega 2$) formed in the shell (15). An air-inlet flap (17) extends on either side of the shell (15) and is driven in rotation by actuating means about an axis parallel to the rotational axis (Z'Z) of the turbine (16).

16 Claims, 7 Drawing Sheets

VENTILATION MODULE

BACKGROUND OF THE INVENTION

1. Field of the Invention

The invention relates to a ventilation module optimized as to size and accessibility, and it applies to the field of the air conditioning and the heating of the passenger compartment of motor vehicles.

2. Description of the Related Art

Ventilation is understood to mean the mixing and the circulation of air with a view to obtaining, by coupling with heat exchangers, a fresh air supply, heating or air conditioning for a local area, such as a vehicle passenger compartment.

Ventilation modules are generally arranged under the instrument panel bulkhead of a motor vehicle. They include a molded casing having at least one air-inlet entry and an air-outlet exit towards the passenger compartment to be heated or to be cooled. Between the air entry and exit, the casing houses an air blower including an assembly called motorized fan unit (MFU for short), an air-intake flap, and a shell encasing the MFU unit and conducting the air, sucked in and blown by the turbine, from the entry to the exit of the casing.

The MFU unit itself consists of an air-suction turbine, of an electric motor for driving the turbine, and of a motor support coupled to a shroud serving as a seating for the turbine. The incoming air is sucked in by the turbine through at least one central orifice formed in the shell and defined by the edges of the shroud. When the MFU is a double-suction type, two orifices are provided: an upper orifice formed above the vanes and a lower orifice formed around the motor.

In the ventilation modules for air conditioning/heating, an air-intake flap is generally provided, allowing for admission of a single suction of air originating from an external source, or a double suction, either of outside air or of recycled air originating from the passenger compartment.

The air-intake flap is conventionally arranged above the shell. It is flat and tilts between two positions, an opening position and a closing position for one and/or the other of the air intakes. This flap is called butterfly flap or flag flap depending on the position of its axis of rotation, central or lateral.

However, this type of flap exhibits the major drawback of using up a significant amount of space in an environment where size is a critical parameter. Moreover, it limits the air-intake passage cross section and does not optimize the orientation of the suctions of air into the shell, in particular in the double-suction layout.

SUMMARY OF THE INVENTION

The present invention aims to resolve these problems by proposing to produce the module in such a way that the flap features an axis of rotation which is substantially parallel to the suction turbine(s).

More precisely, the subject of the invention is a one-piece ventilation module optimized as to size, accessibility and air circulation, consisting of a shell housing accommodating an MFU unit, an inlet flap for letting air into the turbine and means for actuating the flap, the MFU unit comprising at least one turbine driven in rotation by an electric motor about a central rotational axis, the shell being coupled to at least one air intake and outlet formed in an outer housing, the incoming air being sucked in by the turbine through at least one central orifice formed in the shell, and in which the air-inlet flap extends on either side of the shell and is driven in rotation by the actuating means about an axis passing through the space delimited by the housing of the shell parallel to the rotational axis of the turbine(s).

According to one particular embodiment, the air-inlet flap includes a cylindrical dome parallel to the rotational axis of the turbines, terminated along this axis by two circular sectors which are articulated onto this axis, and two peripheral overshoots parallel to this axis bearing on end stops arising from the outer casing.

According to preferred characteristics:

- the actuator drives the flap into intermediate or extreme positions between, on the one hand, a position freeing the outside-air intake and closing a recycled-air intake and, on the other hand, a position closing the outside-air intake and freeing the recycled-air intake, the intermediate positions making it possible to carry out partial recycling of the air;
- the outside-air and recycled-air intakes exhibit shapes matching those of the flap in order to make them leaktight when they are closed by the flap;
- the rotational axis of the flap passes through the shell orifice; in particular, it is coincident with the rotational axis of the turbine;
- the actuator for driving the flap includes a pinion coupled to a micromotor, the pinion and the micromotor being mounted centrally with respect to the flap; this central drive avoids the creation of torsion from the flap on the pinion, which increases the reliability and the leaktightness of the layout;
- the drive actuator also comprises a guide roller in order to prevent the flap escaping from the drive pinion;

According to particular embodiments, the shapes of the flap and of the housing are matched so as to allow the use of movements freeing an exit space which can be used for removing/fitting the MFU. According to advantageous characteristics:

- the housing and the flap exhibit a frustoconical shape in a so-called upper part, opposite the exit space from the MFU, and a cylindrical lower part on the same side as the exit space, the two parts of the housing being detachable from one another via releasable means;
- the module being of the double-suction type, the housing featuring detachable parts, in particular two half-housings, and the shell and the flap featuring lateral flanks, the dimensions of the air-passage orifice of the bottom of the shell, the difference in dimensions between the shell flanks and the flap, and the difference in dimensions between the junction of the two half-housings which is situated at the opposite end to the flap and the bottom of the flap once the lower part of the housing has been withdrawn and the flap translated along its axis coincident with the axis of the turbine, are set so as to clear an exit space which can be used for removing/fitting the MFU;
- the junction between the two parts of the housing situated at the opposite end from the flap is set just above the shell in order to allow withdrawal by translation of the MFU through the exit space created after withdrawing the lower housing part;
- a particular shape of the dome in a hollow, featuring a discontinuity or an indentation parallel to the rotational axis of the turbine, and/or an offset of the amplitude ranges of the flap, and/or a housing overshoot, create a space for removal by rotation of the flap about an axis parallel to the rotational axis of the turbine arranged close to one range end stop;

the flap is produced in two detachable parts, an upper part possibly being conical, arranged at the opposite end to the exit space, and a lower part on the same side as the exit space, the lower part being detached in order to free the space which can be used for removing the MFU.

The invention applies as much to light vehicles as to heavy good vehicles. In this latter case, it is advantageous to provide for the MFU unit to be removed from the engine compartment after the driver's cab been tilted. The ventilation module includes a fixed mechanism plate, which is docked into an aperture of the engine compartment, a flap of the preceding type, flap rotational support means, a means for electrically driving the flap, a removable shell housing and an MFU unit.

The essential functions of ventilation are thus brought together onto a single independent and removable module the settings of which are preserved, which facilitates maintenance and reliability. The MFU unit forms a subassembly mounted in the module via releasable means, independently of the other components, for example by a fixing collar.

According to particular embodiments, the electric drive means is a micromotor arranged in the central part on the removable housing of a double shell symmetrically accommodating two turbines. This central layout makes it possible to avoid torsion of the flap and the additional stiffening means usually used.

This micromotor may advantageously drive the flap by the use of a pinion-type transmission, the pinion possibly being extended by a roller guided in the groove, and the MFU unit is preferably fixed by a removable collar around the motor ring screwed onto the shell housing.

Other characteristics and advantages of the invention will emerge on reading the description which follows relating to exemplary embodiments, by reference to the attached figures which respectively represent:

BRIEF DESCRIPTION OF THE DRAWINGS

FIGS. 7a and 7b, diagrammatic views of an example module intended more particularly for a heavy goods vehicle, respectively along a lateral section and the section along VII—VII of FIG. 7a.

DETAILED DESCRIPTION OF THE PREFERRED EMBODIMENTS

Figure 1:
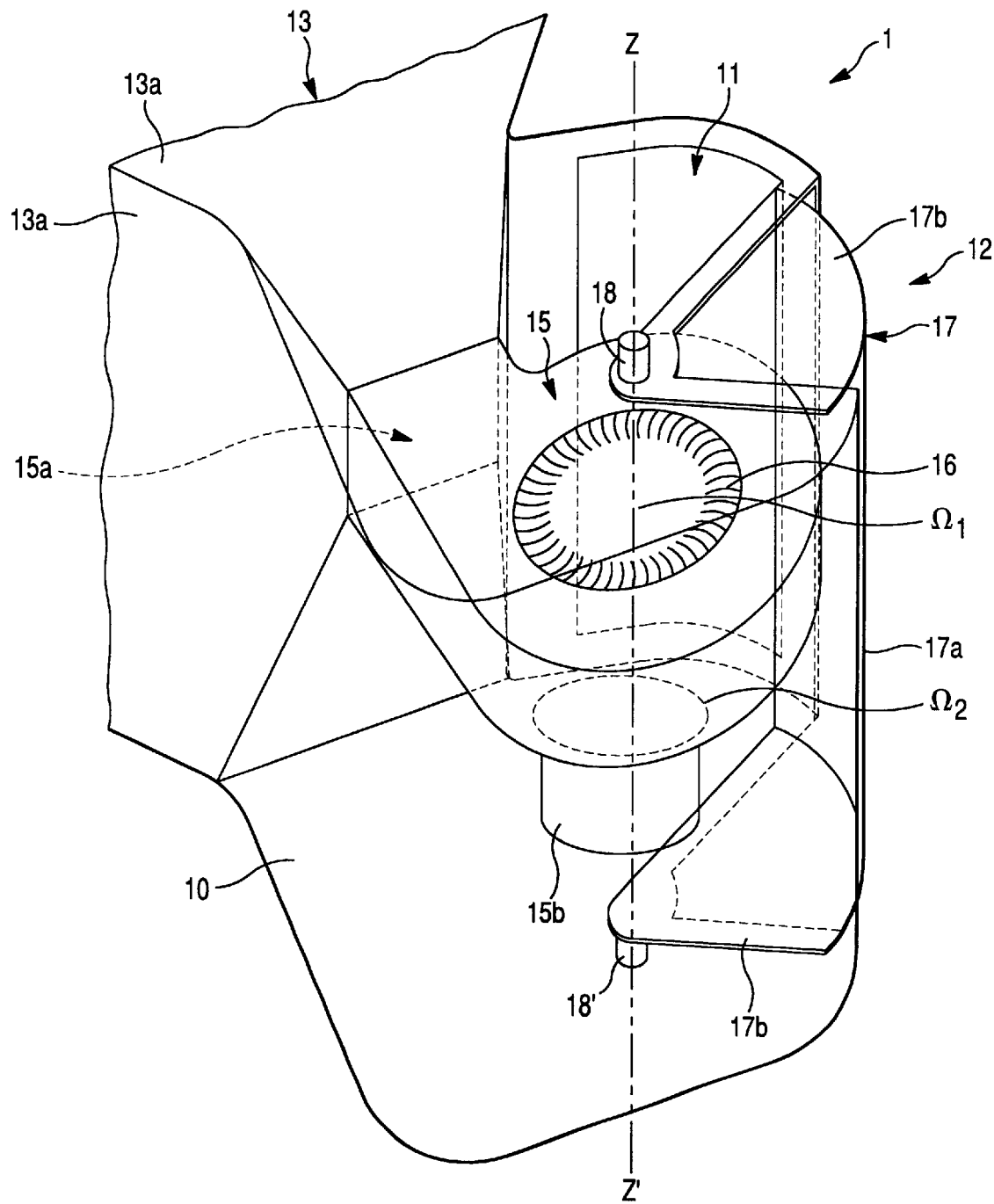
FIG. 1, an overall view in perspective of a ventilation module according to the invention.

FIG. 1 represents an overall view in perspective of an air-conditioning/heating ventilation module 1 according to the invention, intended for a motor-vehicle passenger compartment. This module takes the form of a molded casing 10 from which two air intakes 11 and 12 are cut out, respectively for outside air and for recycling air from the passenger compartment of the vehicle, as well as an air outlet 13, bordered by side walls 13a.

Into the casing 10 is fixed, by screws or by any known means, a molded shell 15 the outlet duct 15a of which is coupled to the air outlet 13. The shell 15 houses a dual-suction motorized fan unit (MFU) 5, formed by the vane-type air-suction turbine 16, by its drive motor and by the motor support (which are not represented). In particular, a cylindrical extension 15b of the shell houses the drive motor. The elements arranged within the casing appear by transparency on the figure.

On either side of the shell 15 a flap 17 is arranged including a cylindrical dome 17a flanked by two circular sectors 17b, the centers of which are mounted so as to rotate on the axis Z'Z of the turbine 16 via shafts 18 and 18'.

Other known elements, which come under the competence of the person skilled in the art, such as the cables and the plugs for supplying the turbine motor, are not represented so as not to overburden the figure.

In operation, the air sucked in by the turbine 16, through the orifices Ω1 and Ω2 of the shell, originates from one or other of the air intakes 11 and 12, depending on the position of the flap 17. In this exemplary embodiment, this flap pivots about the axis of the turbine Z'Z. It is driven in rotation by an actuator, an exemplary embodiment of which will be described further on with reference to FIGS. 7a and 7b, and thus pivots between two extreme positions defining the range of movement of the flap, in terms of amplitude. The blown air is then removed to heat exchangers via the outlet 13.

The module 1 is installed under the bulkhead of the instrument panel of the vehicle. The MFU unit 5 forms a subassembly which is removable from the passenger compartment or from the engine unit, depending on the particular embodiments.

FIGS. 2a to 2d diagrammatically illustrate, in section, a first implementation example facilitating access to the MFU via the passenger compartment.

Figure 2A:
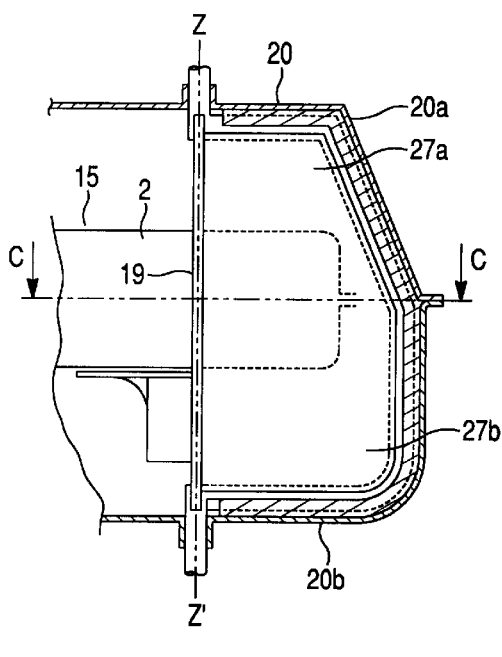
FIGS. 2a to 2d, diagrammatic views in section of an exemplary embodiment of the module which facilitates removing of the motorized fan unit (MFU)
Figure 2B:
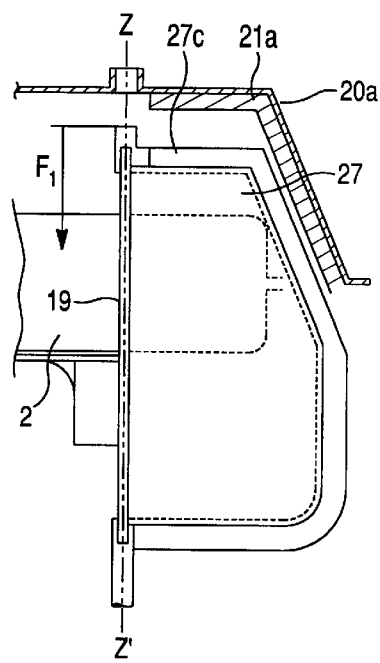

On the partially cutaway sections of FIGS. 2a and 2b along a plane passing through the axis Z'Z, it is apparent that the air-intake flap 27, pivoting about the central shaft 19 with axis Z'Z, features, in a so-called upper part, a frustoconical shape 27a, whereas in its lower part 27b, the flap retains a cylindrical shape. The so-called "upper" or "lower" descriptions of the elements envisaged relate back to their position with respect to the exit space of the MFU, respectively on the side opposite or on the same side as this space.

The casing 20 is composed of two separable parts which closely match the shape of the flap, a frustoconical upper half-housing 20a and a cylindrical lower half-housing 20b. The lower part is withdrawn during removal, more particularly illustrated in FIG. 2b. The connection between the two half-housings 20a and 20b is made by any known means, for example by being clipped or screwed.

The unseating of the flap 27 is achieved by translation along the arrow F1, parallel to the axis Z'Z, after the lower half-housing 20b has been withdrawn.

More particularly, by reference to FIG. 2b, it is apparent that there is a sidewall 27c bordering the flap 27, as well as an end stop 21a on which this wall 27c abuts so as to obtain good air-intake leaktightness in the ventilation module.

Figure 2C:
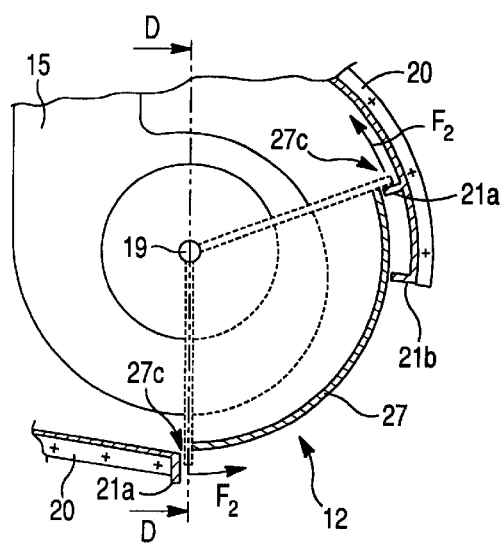
Figure 2D:
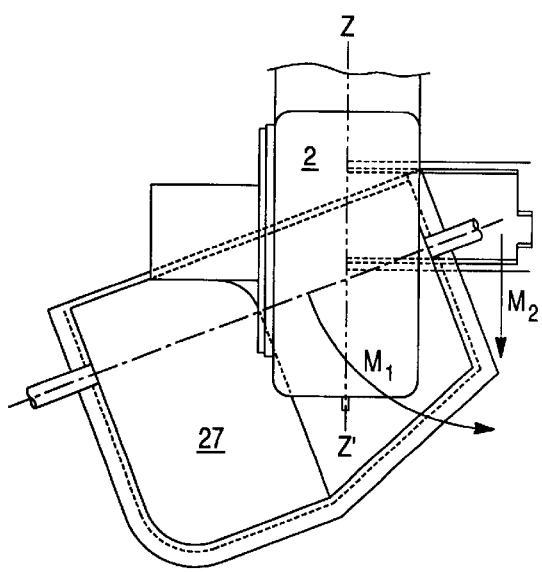

Along the section CC indicated in FIG. 2a, and which is represented in FIG. 2c, there appear more precisely the walls 27c which abut against the end stops 21a or 21b depending on whether the flap closes the intake for recycled air originating from the aperture 12, as represented, or the outside-air intakes 11 when it is driven in pivoting motion along the arrows F2 so as to open the recycled-air intake 12.

In FIG. 2c, which represents the sectional view of the module along the track DD indicated in FIG. 2c, are indicated the movements M1 and M2 for unseating the flap 27. The movement M1 is a rotational movement which follows the translational movement physically represented by the arrow F1 (FIG. 2b). The movement M2 is a translational movement parallel to the axis Z'Z. The movements M1 and M2 may be successive or simultaneous.

Figure 3A:
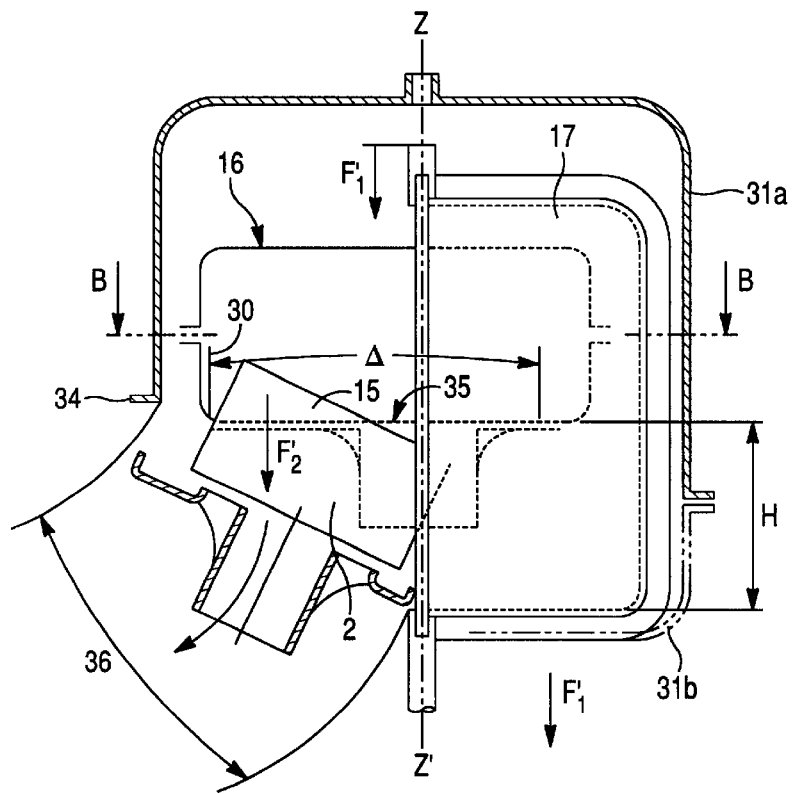
FIGS. 3a and 3b, diagrammatic sections of another exemplary embodiment facilitating this same removal.
Figure 3B:
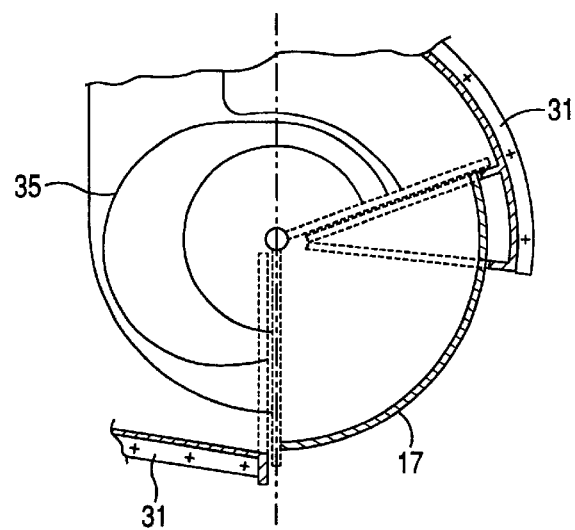

Another exemplary embodiment is illustrated in section in FIGS. 3a and 3b, respectively along a plane passing through the axis Z'Z and along the track BB (FIG. 3a). The removal of the MFU 5 is then obtained by the choice of dimensioning between the suction orifice 35 defined in the bottom of the shell, and the offset H along the axis Z'Z between the bottom of the shell 15 and the bottom of the flap 17, positioned after a translation along arrow F'1 along the axis Z'Z at the level of the lower part 31b of the housing. This choice directly conditions the removability of the MFU unit.

Hence, in this embodiment example, the junction 34 between the upper part 31a and lower part 31b of the housing is situated, on the side opposite the flap 17, at a height approximately equal to that of the bottom of the shell 15. Under these conditions, after withdrawal of the lower part 31b of the housing and translation of the flap along the axis Z'Z (arrow F'1), the MFU unit 5 is unseated into the passage space 36 formed between the junction part 34 and the flap 17 (arrows F'2).

In FIG. 3b, the orifice 35 for passing into the shell bottom appears more precisely. Obviously, the MFU unit 5 is unseated only after the lower part of the shell 15 has been withdrawn.

Figure 4A:
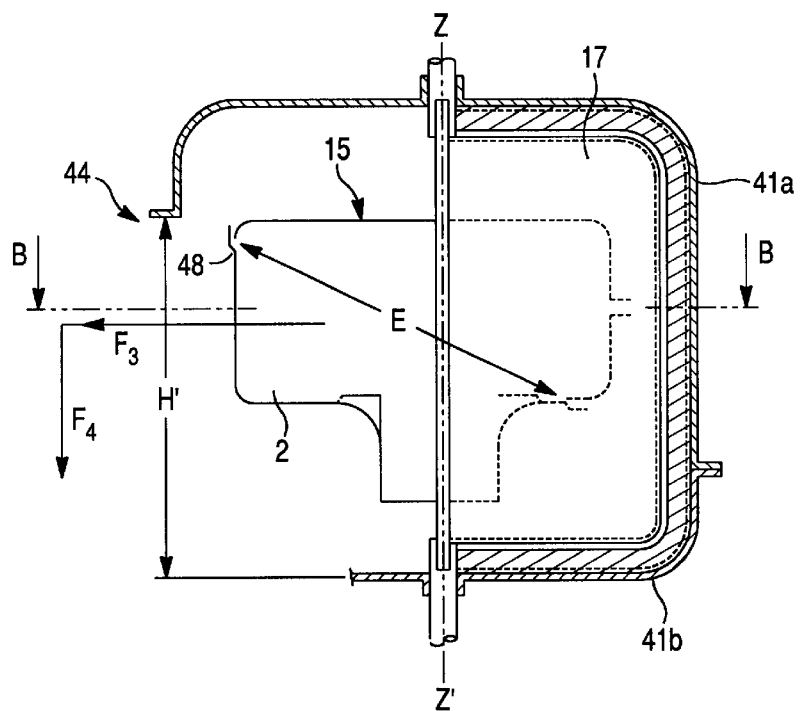
FIGS. 4a and 4b, diagrammatic sections illustrating another exemplary embodiment.
Figure 4B:
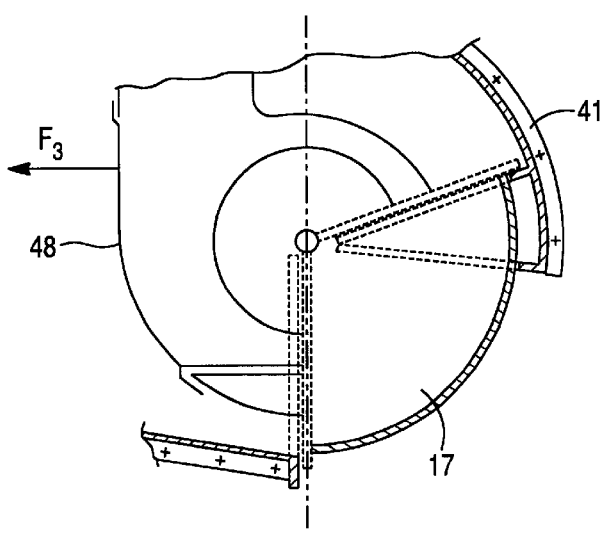

With reference to FIGS. 4a and 4b, another embodiment of the module according to the invention is represented, FIG. 4a being a sectional view along the axis Z'Z, and FIG. 4b a sectional view along the track BB of FIG. 4a. In this example, the junction 44 between the half-housings 41a and 41b of the module of the invention, situated on the side opposite the air-intake flap 17, is arranged just above the upper part of the shell 15. In this way, the MFU unit can be withdrawn by translation along the arrow F3 from the shell housing part 48 with transverse size E. The translation is carried out perpendicularly to the axis Z'Z, through the passage space of height H'. The removal of the MFU unit 5 is obtained by translation along the arrow F3 then, depending on the environment, along the arrow F4, respectively perpendicular and parallel to the axis Z'Z, after having withdrawn the lower half-housing 41b or only a part thereof.

It is also possible to remove the MFU unit by unseating the air-intake flap by a suitable rotation about an axis situated close to the housing wall of the module according to the invention. On the sectional views of FIGS. 5a to 5c, along a plane perpendicular to the axis Z'Z, three examples of flaps with a shape suitable for such a rotation are illustrated.

With reference to these three figures, the air-intake flap, referenced respectively 57, 58 and 59, is displaced in rotation along the arrow F5, along an axis T–T situated close to the sealing end stop 51 of the housing 50, the flap then being freed through an air intake 12 by translation along the arrow F6. This unseating is possible only after having lifted off the lower part of the housing 50, partly or wholly depending on the environment, and having translated the flap along its axis Z'Z in the direction of this lower part. The MFU unit can then be released, after unseating the flap, by translation along its axis Z'Z.

Figure 5A:
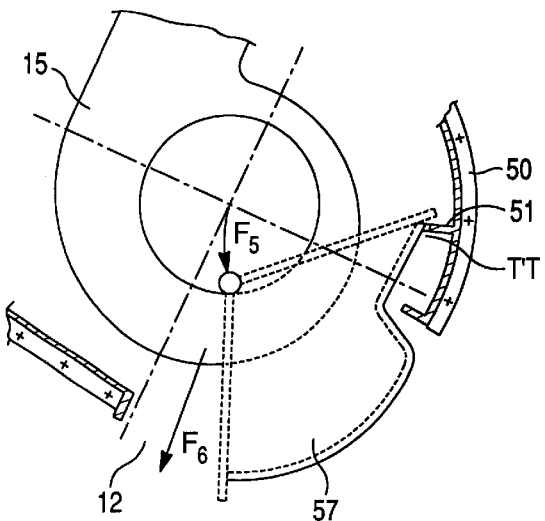
FIGS. 5a to 5c, diagrammatic sections of particular shapes of flaps.
Figure 5B:
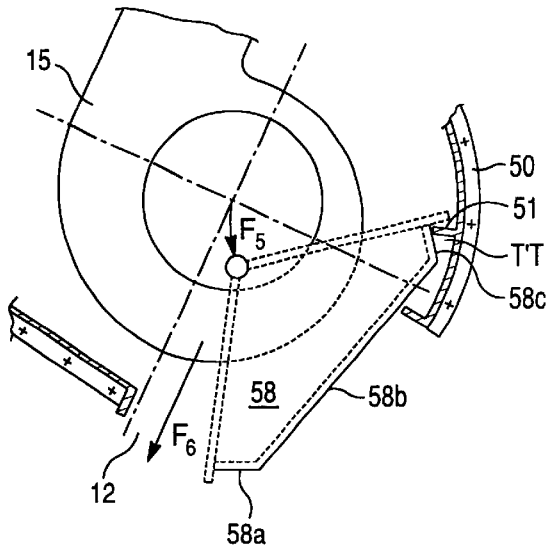

In order to allow these various movements, the dome of the air-intake flap 57 or 58, represented in FIGS. 5a and 5b, exhibits a suitable shape, respectively by local deformation forming a hollow or in a prismatic shape, with flat faces 58a to 58c. In a variant, these faces may be at least partially concave so as to exhibit an indentation.

Figure 5C:
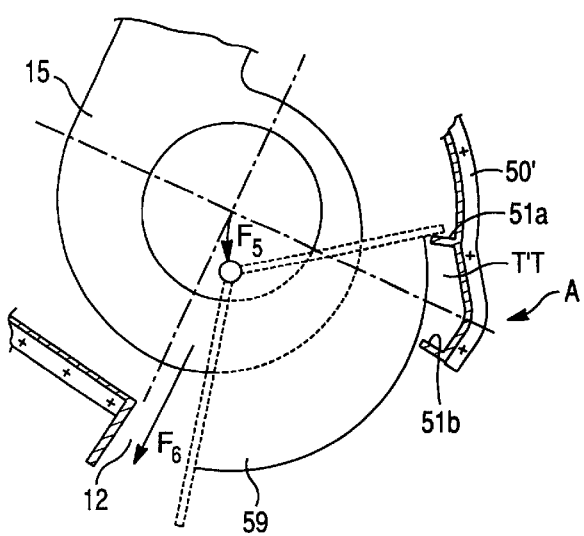

In the variant present in FIG. 5c, the ranges of the flap 59 are offset, so as to keep a cylindrically domed flap. This is conveyed by a shape of the housing 50' featuring an overshoot A between the end stops 51a and 51b defining the said ranges.

According to another embodiment, still suitable for removal of the MFU from the passenger compartment of the vehicle, the air-intake flap is formed from two parts, a so-called upper part and a so-called lower part, the lower part being removable so as to free the MFU removal space.

Figure 6A:
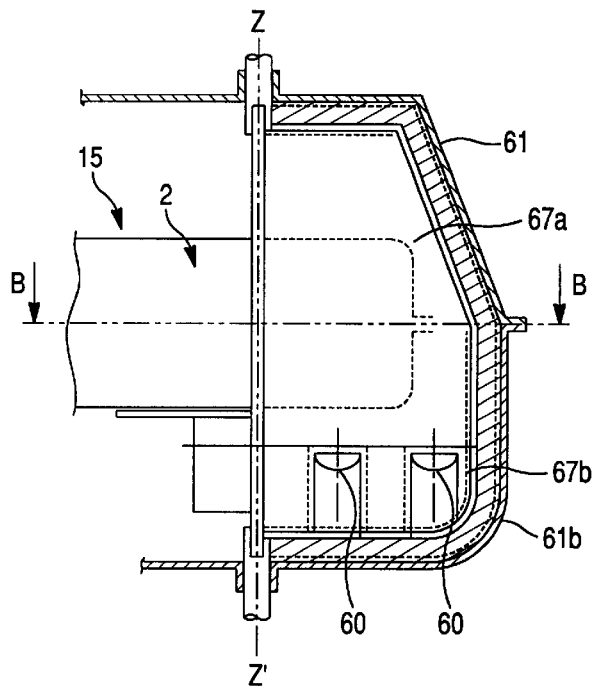
FIGS. 6a to 6c, diagrammatic sections of an example of two-part flaps.
Figure 6C:
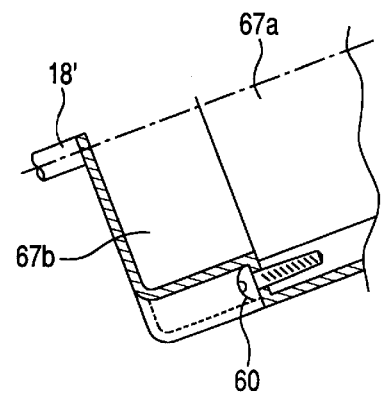
Figure 6B:
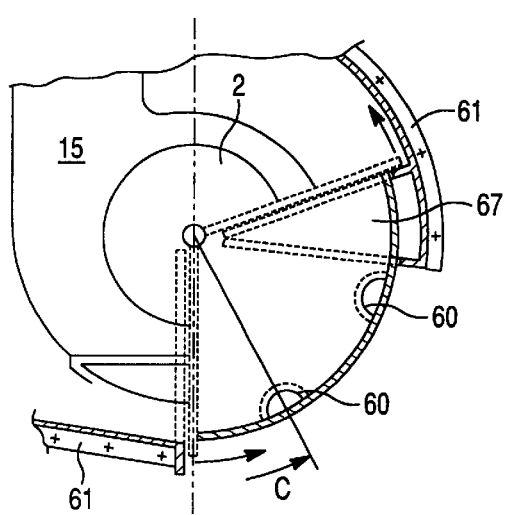

With reference to FIGS. 6a to 6c, respectively in section along a plane containing the axis Z'Z, in section along the plane DD of FIG. 6a and along the half-plane C of FIG. 6b, the air-intake flap 67 is presented in two parts, an upper part 67a and a lower part 67b, the part 67a being partially frustoconical in this non-limiting embodiment.

The parts 67a and 67b are fixed by screws 60 in the example illustrated. Any other known fixing means (clip, hook, collar, etc.) can also be used.

In order to free the space for removing the MFU, the following operations are performed:
  removal of the lower air-intake housing 61b;
  removal of the air-intake flap lower part 67b; and
  removal of the MFU 5 with a translational movement along its axis Z'Z.

Moreover, the flap is conventionally driven by electric means. In order to avoid deformation of the flap by torsion during its movement, it is appropriate to provide for a central mounting of the drive actuator comprising a micromotor 90 driving a pinion 75, as in the embodiment example illustrated with reference to FIGS. 7a and 7b.

Figure 7A:
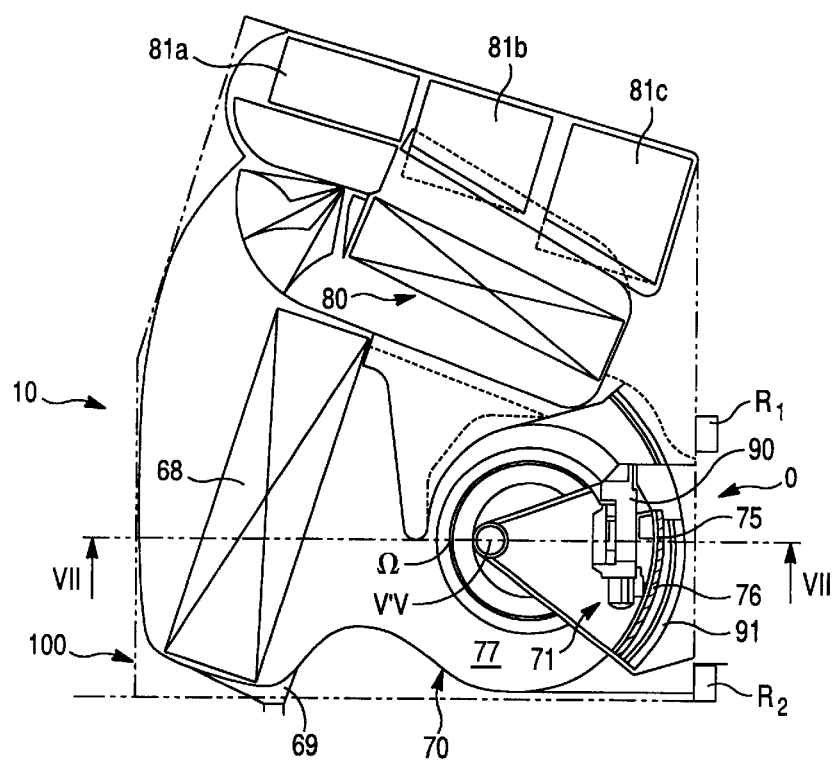
Figure 7B:
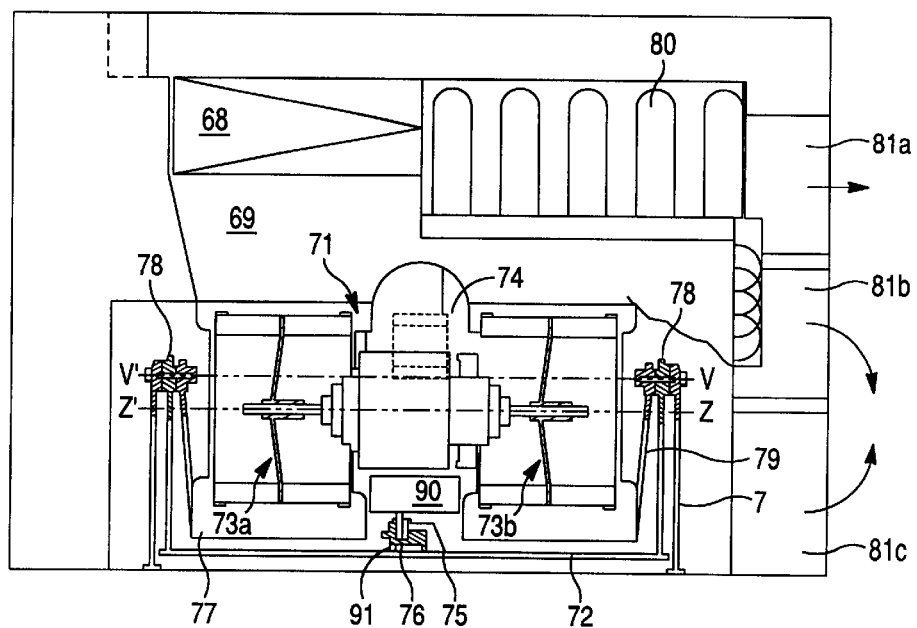

These figures respectively represent a view in lateral section along the plane perpendicular to the axis Z'Z, and a view in section along VII—VII of FIG. 7a, of an air-conditioning/heating assembly installed into a heavy goods vehicle. This assembly incorporates an evaporator 68, a condenser 69 and a ventilation module 70 according to the invention. The MFU unit 71 of this module is made accessible from the engine compartment of the vehicle via a mechanism plate 7 after the driver's cab of the vehicle has been tilted.

The one-piece ventilation module is fixed onto the mechanism plate 7 which is docked into an aperture O formed in the structure 100 of the vehicle and bounded by the reinforcing bars R1 and R2. The removable, one-piece module comprises the mechanism plate 7, a flap 72, flap-actuating means, a shell housing formed by a shroud 77 accommodating an MFU unit and support arms 79 for the housing, the mechanism plate supporting the flap and the arms. The shell is closed by a cover which is articulated onto the housing 77 via a leaktight joint. This cover can be re-centered if necessary from the axis of the mechanism plate.

In this embodiment, the actuating means comprise a drive micromotor 90 fixed to the shell housing, and the MFU unit includes two turbines 73a and 73b, the unit being fixed by a removable collar 74 around the motor ring screwed onto the shroud 77.

The micromotor 90 is arranged at the central part on the shroud 77 of the shell symmetrically housing the two turbines 73a and 73b. This micromotor 90 drives the flap 72 by the use of a pinion-type transmission 75, the pinion being extended by a roller 76 guided in a groove 91, formed by molding in the flap 72. This roller makes it possible to prevent the flap 72 coming out of the central drive pinion 75.

The flap 72 is mounted in rotation about an axis V'V, situated in the suction orifice Ω of the shell parallel to the axis Z'Z of the turbines. The rotational shafts 78 of the flap 72 and the support arms 79 of the shroud 77 are mounted on the axes of the mechanism plate 7.

A hot/cold air mixer, with alternate labyrinths 80, with dimensions 1.5 times greater than the usual mixing devices, is used at the outlet. Various channels 81a to 81c are provided so as to blow the air for different orientations indicated according to the arrows: the lower level, and windscreen de-icing, ventilation.

The invention is not limited to the embodiments described and represented. The various forms proposed may in fact be used independently or in combination, for example the conical shape of the ventilation housing and of the flap may be applied in order to facilitate the removal of the MFU in other embodiment examples. Moreover, intermediate positions of the flap may be provided for, between the extreme positions.

What is claimed is:

1. A ventilation module comprising a shell housing (15, 8, 77) accommodating a motorized fan unit (2), an air inlet flap for letting air into a turbine and an actuating mechanism adapted to actuate the air inlet flap, the motorized fan unit (2) comprising at least one turbine (16, 73a, 73b) driven in rotation by an electric motor about a central rotational axis (Z'Z), the shell housing (15) being coupled to at least one air intake (11, 12) and outlet (13) formed in an outer casing (10), incoming air being sucked in by the turbine (16) through at least one central orifice (Ω1,Ω2) formed in the shell housing (15), wherein the air-inlet flap (17, 27, 57 to 59, 72) extends on either side of the shell housing (15) and is driven in rotation by the actuating mechanism (75, 79, 79', 90) about an axis (V'V) passing through a space delimited by the shell housing parallel to the rotational axis (Z'Z) of the turbine (73a, 73b), and the housing shell being formed of detachable parts, said detachable parts being dimensioned such that removal of one of said detachable parts facilitates removal of said motorized fan unit through a clearance between said remaining part of said shell housing and said air inlet flap.

2. Ventilation module according to claim 1, in which the air-inlet flap (17) includes a cylindrical dome (17a) parallel to the rotational axis (Z'Z) of the turbines, terminated along this axis by two circular sectors (17b) which are articulated onto this axis, and two peripheral overshoots (27c) parallel to this axis bearing on end stops (21a, 21b) arising from the outer casing.

3. Ventilation module according to claim 1, wherein the at least one air intake comprises an outside-air intake and a recycled-air intake, and the actuation mechanism drives the flap (17) between a first position freeing the outside-air intake (11) and closing a recycled-air intake (12) and a second position closing the outside-air intake and freeing the recycled-air intake.

4. Ventilation module according to claim 3, wherein the outside-air and recycled-air intakes are shaped corresponding to a shape of the flap to facilitate a leaktight relationship when the outside-air and recycled-air intakes are closed by the flap, the rotational axis (V'V) of the flap passing through the at least one central orifice (Ω1, Ω2) of the shell housing (15).

5. Ventilation module according to claim 4, in which the housing (20) and the flap (27) exhibit a frustoconical shape in a so-called upper part, opposite the exit space from the motorized fan unit, and a cylindrical lower part on the same side as the exit space, the two parts of the housing being detachable from one another via releasable means.

6. Ventilation module according to claim 4, in which, the housing featuring detachable parts (31a, 31b), the shell and the flap lateral flanks (30), the dimensions of the central passage orifice (35) of the bottom of the shell, the difference (H) in dimensions between the shell flanks and the flap, and the difference in dimensions between the junction (34) of the two parts of the housing which is situated at the opposite end to the flap (17) and the bottom of the flap once the lower part of the housing has been withdrawn and the flap translated along its axis coincident with the axis (Z'Z) of the turbine, are set so as to clear an exit space (36) which can be used for removing/fitting the motorized fan unit.

7. Ventilation module according to claim 4, in which the junction (44) between the two parts (41a, 41b) of the housing situated at the opposite end from the flap (17) is set just above the shell in order to allow withdrawal by translation (F3, F4) of the shell part (48) and of the motorized fan unit through the orifice (H') created after withdrawing the lower housing part (41b).

8. Ventilation module according to claim 4, in which a shape of the dome of the flap (57) in a hollow and/or a housing (50') overshoot (A), create amplitude ranges of the flap (59) and/or a prismatic shape of the flap (58), create a space for removal by rotation of the flap about an axis (T'T) parallel to the rotational axis of the turbine which are arranged close to one range end stop (51).

9. Ventilation module according to claim 4, in which the flap is produced in two detachable parts (67a, 67b), an upper part at least partly conical, arranged at the opposite end to the exit space, and a lower part on the same side as the exit space, the lower part being detached in order to free the space which can be used for removing the motorized fan unit.

10. Ventilation module according to claim 1, in which a mechanism plate (7), which is docked into an aperture (O) formed in the structure (100) of a vehicle, is provided for mounting the shell housing (77) accommodating the motorized fan unit (71) and the flap (72).

11. Ventilation module according to claim 10, in which the shell housing (77) is mounted by support arms (79), the motorized fan unit (71) is fixed by a removable collar (74) to the shell housing (77) and the flap is mounted by rotational shafts (78).

12. Ventilation module according to claim 11, in which the actuation mechanism comprise a drive micromotor (90) fixed centrally onto the shell housing (77) which symmetrically accommodates two turbines (73a, 73b).

13. Ventilation module according to claim 12, in which the micromotor (90) drives the flap (72) by the use of a central transmission via a pinion (75) extended by a roller (76) guided in a groove (91) formed in the flap (72).

14. The ventilation module according to claim 1, wherein said detachable parts of said shell housing comprise an upper half-housing and a lower half housing, said air inlet flap having lateral flanks disposed between opposite flanks of said shell housing, wherein a difference in dimensions between a junction between said upper half housing and said lower half housing and a difference between dimensions between said lateral flanks of said air inlet flap and said opposite flanks of said shell housing is such that upon removal of said lower half housing and said flap is translated along an axis coincident with the rotational axis of the turbine an exit space is created to permit the removal of said motorized fan unit from said ventilation module.

15. The ventilation module according to claim 1, wherein said detachable parts of said shell housing comprise an upper half-housing and a lower half housing, wherein a dimension between a junction between said upper half housing and said lower half housing is such that upon removal of said lower half housing an exit space is created to permit the removal of said motorized fan unit from said ventilation module.

16. The ventilation module according to claim 1, further comprising:

the rotatable air inlet flap removably mounted to said shell housing wherein when air inlet flap is removed from said shell housing an exit space is created to permit the removal of said motorized fan unit from said ventilation module.

* * * * *